United States Patent
Stoller et al.

(10) Patent No.: US 8,568,271 B2
(45) Date of Patent: *Oct. 29, 2013

(54) SYSTEM AND METHOD TO PREVENT SHIFT HUNTING IN A POWERTRAIN

(75) Inventors: Jason Stoller, Morton, IL (US); Adam J. Vaccari, Peoria, IL (US); Michael D Beyer, Chillicothe, IL (US); Christopher A Rhoades, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/089,664

(22) Filed: Apr. 19, 2011

(65) Prior Publication Data

US 2012/0270699 A1 Oct. 25, 2012

(51) Int. Cl.
*B60K 31/00* (2006.01)
*B60K 31/04* (2006.01)
*F16H 61/662* (2006.01)

(52) U.S. Cl.
USPC .............................................. 477/42; 701/54

(58) Field of Classification Search
USPC ............ 477/42, 44, 69, 108, 115; 701/54–56, 701/58, 51, 60
See application file for complete search history.

(56) References Cited

U.S. PATENT DOCUMENTS

| | | | |
|---|---|---|---|
| 4,246,807 A * | 1/1981 | Kofink | 477/15 |
| 5,025,685 A | 6/1991 | Kobayashi et al. | |
| 5,046,009 A | 9/1991 | Abo et al. | |
| 5,146,812 A | 9/1992 | Nikolaus et al. | |
| 5,206,805 A | 4/1993 | Petzold et al. | |
| 6,393,945 B1 | 5/2002 | Kuras | |
| 6,663,534 B2 | 12/2003 | Klosel et al. | |
| 2003/0191571 A1* | 10/2003 | Aldrich et al. | 701/54 |
| 2006/0276291 A1* | 12/2006 | Fabry et al. | 475/72 |
| 2008/0027614 A1 | 1/2008 | Field et al. | |
| 2009/0005941 A1 | 1/2009 | Demarco et al. | |
| 2010/0248886 A1* | 9/2010 | Jozaki et al. | 475/210 |
| 2012/0065853 A1* | 3/2012 | Stoller et al. | 701/58 |
| 2012/0065854 A1* | 3/2012 | Stoller et al. | 701/60 |

FOREIGN PATENT DOCUMENTS

| | | |
|---|---|---|
| JP | 1992138931 | 9/1991 |
| WO | 2012033779 A2 | 3/2012 |

OTHER PUBLICATIONS

Co-pending U.S. Appl. No. 12/879,719; System and Method to Prevent Shift Hunting in a Powertrain, filed Sep. 10, 2010.
Co-pending U.S. Appl. No. 12/879,647; System and Method to Prevent Shift Hunting in a Powertrain, filed Sep. 10, 2010.

* cited by examiner

*Primary Examiner* — Justin Holmes
(74) *Attorney, Agent, or Firm* — Robin S. Fahlberg

(57) ABSTRACT

A method for preventing shift hunting in a powertrain including an engine and a transmission having a variator, a first gearset, and a second gearset is disclosed. The method includes operating the engine at a first substantially constant speed, detecting a shift condition, and operating the engine at a second substantially constant speed as a function of detecting the shift condition. The second speed is different than the first speed.

22 Claims, 3 Drawing Sheets

SYSTEM AND METHOD TO PREVENT SHIFT HUNTING IN A POWERTRAIN

TECHNICAL FIELD

The present disclosure relates generally to continuously variable transmissions. Specifically, the present invention relates to the shifting of continuously variable transmissions.

BACKGROUND

When a vehicle or machine including a transmission is operated in a band around a shift point of the transmission, the transmission may experience shift hunting which can result in increased fuel consumption, operator discomfort or irritation, and transmission wear or damage. Delaying a shift point may alleviate the shift hunting condition, but may cause asynchronous shifts. When a drivetrain includes flexible or fluid couplings, such as a torque converter, these couplings may absorb the shocks from asynchronous shifts. However, in a drivetrain without a flexible or fluid coupling, forces and shocks to the driveline resulting from asynchronous shifts may cause damage. Jerking from the asynchronous shifts may cause operator discomfort or irritation.

U.S. Pat. No. 6,663,534 discloses a method for preventing oscillating gearshifts of a motor vehicle automatic transmission with an electronic transmission control device. The control device monitors the current road resistance from a comparison of measured vehicle acceleration with a theoretical vehicle acceleration and determines therefrom the value of differential acceleration. The engine torque is reduced if: (a) the position of the accelerator pedal of the motor vehicle is greater than a first limit value; (b) the differential acceleration is greater than a second limit value; (c) the measured vehicle acceleration is greater than a positive third limit value; (d) the theoretical impingement in the next higher gear is lower than a fourth limit value; and (e) the current engine speed is greater than a fifth limit value.

SUMMARY OF THE INVENTION

A powertrain includes an engine and a transmission having a variator, a first gearset, and a second gearset. A method for preventing shift hunting in the powertrain includes operating the engine at a first substantially constant speed, detecting a shift condition, and operating the engine at a second substantially constant speed as a function of detecting the shift condition. The second speed is different than the first speed.

A system for preventing shift hunting includes a powertrain and a controller. The powertrain includes an engine and a transmission operably connected to the engine. The transmission has a variator, a first gearset, a second gearset, and an output. The controller is configured to operate the engine at a first substantially constant speed, detect a shift condition, and operate the engine at a second substantially constant speed, the second speed different than the first speed as a function of detecting the shift condition.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
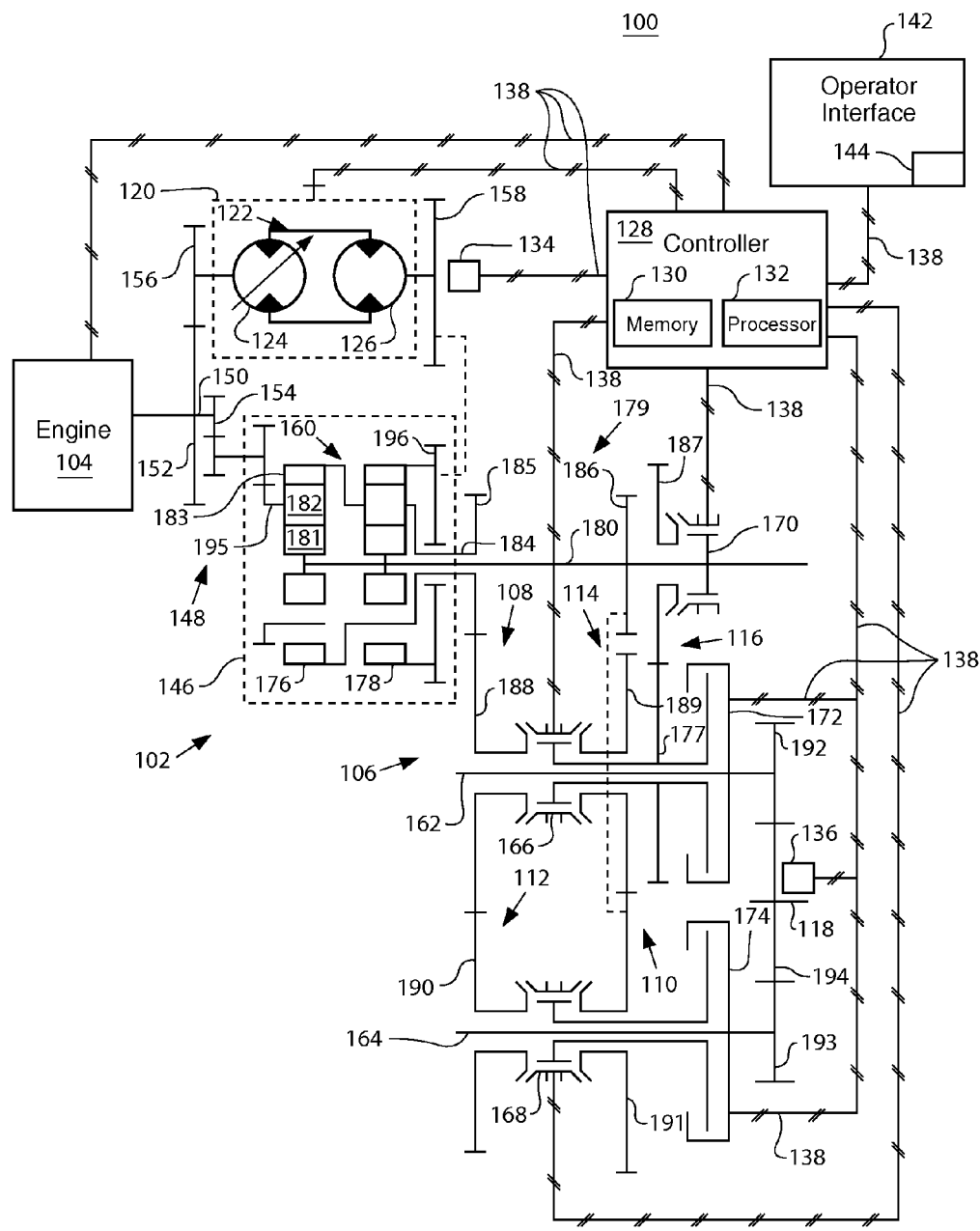
FIG. 1 depicts a schematic view of an exemplary embodiment of a system to prevent shift hunting in a powertrain.

FIG. 1 illustrates a schematic view of a system to prevent shift hunting 100. The system includes a powertrain 102, a controller 128, and an operator interface 142. The system 100 may be included in a vehicle (not shown) to provide power and/or motor force to move the vehicle in a direction. In another embodiment, the system 100 may be included in a stationary machine (not shown) to provide power, for example, in a manufacturing environment.

The powertrain 102 may include any group of components that generate and deliver power to a vehicle or a stationary machine. The delivered power may move the vehicle and/or allow the vehicle or stationary machine to do work as is known by an ordinary person skilled in the art now or in the future. The powertrain 102 may deliver power to one or more drive axle, wheel, track, propeller, or any other device that will move the vehicle in a direction. The powertrain 102 may also deliver power to a system that allows the vehicle to do work. In another embodiment, the powertrain 102 may deliver power to a stationary machine.

The powertrain 102 includes an engine 104 and a transmission 106. For purposes of this application the engine 104 may include any machine that converts energy into mechanical force or motion as would be known by an ordinary person skilled in the art now or in the future; and is capable of powering the transmission 106 as described herein. In the depicted embodiment the engine 104 converts energy into rotational force and/or motion through rotating transmission input member 150. In one embodiment the engine 104 is an internal combustion piston engine configured to provide rotational force at a rotational velocity within a narrow range.

For purposes of this application the transmission 106 may include one or more of a mechanical transmission, any variator, gearing, belts, pulleys, discs, chains, pumps, motors, clutches, brakes, torque converters, fluid couplings and any transmission that would be known by an ordinary person skilled in the art now or in the future. In the depicted embodiment, the transmission 106 includes a variator 120, an adder 146, mechanical gearing 148, a first gearset 108, a second gearset 110, a third gearset 112, a fourth gearset 114, a fifth gearset 116, and a transmission output 118.

For purposes of this application the variator 120 is a transmission device which can change its' gear ratio continuously as would be known by an ordinary person skilled in the art now or in the future. Examples of variators 120 include belt driven CVTs, toroidal CVTs, hydrostatic transmissions 122, and electric generator and motor combinations.

In the depicted embodiment, the variator 120 includes a hydrostatic transmission 122 (or hystat 122). The hystat 122 includes a variable displacement pump 124 and a hydraulic motor 126. In an alternative embodiment the variator 120 may include an electric power generator and an electric motor (not shown).

In the depicted embodiment, the engine 104 outputs rotational energy and force to the transmission 106 through input member 150. Input member 150 transmits power to the variator 120 through first fixed input gear 152 and variator input gear 156. The term "fixed" may be understood as being integral with, permanently attached, interconnected through a splined connection, or fused by welding, for example, or by any other means that would be known to an ordinary person skilled in the art now or in the future.

The mechanical gearing 148 may include any shafts, gears, and/or other mechanical devices which transmit power from engine 104 to adder 146 as would be known by an ordinary person skilled in the art now or in the future. In the depicted embodiment, the mechanical gearing 148 includes a second fixed input gear 154 and first planetary input gear 195. The input member 150 transmits power through a second power path to mechanical gearing 148 through second fixed input gear 154 and first planetary input gear 195.

The adder 146 combines two power path outputs, one from the variator 120 and the other from the mechanical gearing 148, to selectively transmit power to one of the first gearset 108, the second gearset 110, the third gearset 112, the fourth gearset 114, or the fifth gearset 116. The adder 146 may include any device or set of devices that is/are operable to combine multiple power paths and selectively provide the combined power to a gearset 108, 110, 112, 114, 116 that would be known to an ordinary person skilled in the art now or in the future.

In the depicted embodiment, the adder 146 includes planetary arrangement 160. Planetary arrangement 160 includes first and second planetary gearsets 176 and 178, and a planetary output shaft 179. Each planetary gearset 176 and 178 includes a sun gear 181, a carrier 182, and a ring gear 183, as is known by an ordinary person skilled in the art. The planetary output shaft 179 includes an internal shaft 180 and a sleeve 184, such as a hollow member or hub, which is supported by the internal shaft 180.

The internal shaft 180 connects to the sun gears 181 of the first and second planetary gear sets 176, 178. The sleeve 184 outputs from the carrier 182 of the second planetary gear set 178 through a first planetary output gear 185. The internal shaft 180 outputs from the sun gears 181 of the first and second planetary gear sets 176, 178 through a second planetary output gear 186 and through an auxiliary drive gear 187. The first and second planetary output gears 185 and 186 are fixed to the planetary output shaft 179, while the auxiliary drive gear 187 rotates thereon.

The transmission 106 depicted includes a first synchronizer 166, a second synchronizer 168, and a third synchronizer 170. The first and second synchronizers 166 and 168 are three-position synchronizers adapted to move from a neutral position to either of two positions, dependent on a preferred speed and direction. The third synchronizer 170 is fixed to the internal shaft 180 of the planetary output shaft 179, permanently, or through a coupling such as a spline, and moves from a neutral position to an engaged position.

The first gearset 108 includes the first planetary output gear 185, a first low speed reduction gear 188, a first output member 162, the first synchronizer 166, a first clutch assembly 172, and a first output shaft gear 192. When the first gearset 108 drives the transmission output 118, the transmission 106 may be in a low forward gear 306 (described in relation to FIG. 3) to provide power to the vehicle or stationary machine. When the first gearset 108 is driving the transmission output 118, the first planetary output gear 185 engages the first low speed reduction gear 188. The first synchronizer 166 and the first clutch assembly 172 are controlled by the controller 128 to allow the first low speed reduction gear 188 to drive the first output member 162, the first output member 162 to drive the first output shaft gear 192, and the first output shaft gear 192 to drive a final drive gear 194 which drives the transmission output 118 as would be known by an ordinary person skilled in the art now or in the future.

The second gearset 110 includes the second planetary output gear 186, a second high speed reduction gear 191, a second output member 164, the second synchronizer 168, a second clutch assembly 174, and a second output shaft gear 193. When the second gearset 110 drives the transmission output 118, the transmission 106 may be in a high forward gear 308 (described in relation to FIG. 3) to provide power to the vehicle or stationary machine. When the second gearset 110 is driving the transmission output 118, the second planetary output gear 186 engages the second high speed reduction gear 191. The second synchronizer 168 and the second clutch assembly 174 are controlled by the controller 128 to allow the second high speed reduction gear 191 to drive the second output member 164, the second output member 164 to drive the second output shaft gear 193, and the second output shaft gear 193 to drive the final drive gear 194 which drives the transmission output 118 as would be known by an ordinary person skilled in the art now or in the future.

The third gearset 112 includes the first planetary output gear 185, a second low speed reduction gear 190, the second output member 164, the second synchronizer 168, the second clutch assembly 174, and the second output shaft gear 193. When the third gearset 112 drives the transmission output 118, the transmission 106 may be in a low reverse gear 310 (described in relation to FIG. 3) to provide power to the vehicle or stationary machine. When the third gearset 112 is driving the transmission output 118, the first planetary output gear 185 engages the second low speed reduction gear 190. The second synchronizer 168 and the second clutch assembly 174 are controlled by the controller 128 to allow the second low speed reduction gear 190 to drive the second output member 164, the second output member 164 to drive the second output shaft gear 193, and the second output shaft gear 193 to drive the final drive gear 194 which drives the transmission output 118 as would be known by an ordinary person skilled in the art now or in the future.

The fourth gearset 114 includes the second planetary output gear 186, a second high speed reduction gear 189, the first output member 162, the first synchronizer 166, the first clutch assembly 172, and the first output shaft gear 192. When the fourth gearset 114 drives the transmission output 118, the transmission 106 may be in a high reverse gear 312 (described in relation to FIG. 3) to provide power to the vehicle or stationary machine. When the fourth gearset 114 is driving the transmission output 118, the second planetary output gear 186 engages the first high speed reduction gear 189. The first synchronizer 166 and the first clutch assembly 172 are controlled by the controller 128 to allow the first high speed reduction gear 189 to drive the first output member 162, the first output member 162 to drive the first output shaft gear 192, and the first output shaft gear 192 to drive a final drive gear 194 which drives the transmission output 118 as would be known by an ordinary person skilled in the art now or in the future.

The fifth gearset 116 includes an output auxiliary speed gear 187, an auxiliary output gear 177, a first output member 162, the third synchronizer 170, the first clutch assembly 172, and the first output shaft gear 192. When the fifth gearset 116 drives the transmission output 118, the transmission 106 may be in an auxiliary gear 314 (described in relation to FIG. 3) to provide power to the vehicle or stationary machine. When the fifth gearset 116 is driving the transmission output 118, output auxiliary speed gear 187 engages the auxiliary output gear 177. The third synchronizer 170 and the first clutch assembly 172 are controlled by the controller 128 to allow the auxiliary output gear 177 to drive the first output member 162, the first output member 162 to drive the first output shaft gear 192, and the first output shaft gear 192 to drive a final drive gear 194 which drives the transmission output 118 as would be known by an ordinary person skilled in the art now or in the future.

Examples of the function and position of the synchronizers 166, 168, 170 and clutch assemblies 172, 174 when the transmission 106 is shifting in the depicted embodiment are described in more detail in U.S. Pat. No. 7,530,913 B2 and would be well known by an ordinary person skilled in the art.

In the depicted embodiment, the transmission 106 includes a variator output speed sensor 134 and a transmission output speed sensor 136. The variator output speed sensor 134 is configured to generate a signal indicative of the output speed of the variator 120 at the variator output gear 158. The transmission output speed sensor 136 is configured to generate a signal indicative of the output speed of the transmission 106 at transmission output 118.

The operator interface 142 may include devices with which a vehicle or stationary machine operator communicates with, interacts with, or controls the vehicle or stationary machine. In one embodiment. the operator interface 142 may include devices with which the operator interacts physically. In another embodiment, the devices may operate with voice activation. In still other embodiments, the operator may interact with the operator interface 142 in any way an ordinary person skilled in the art would contemplate now or in the future.

In the embodiment depicted, the operator interface 142 includes a torque pedal 144. The operator may depress the torque pedal 144 to indicate a desired vehicle or machine output torque. The desired output torque may be applied to ground engaging devices such as wheels or tracks. In other embodiments the desired toque may be a machine shaft, or on a marine vehicle, a propeller. In the depicted embodiment, the torque pedal 144 and/or devices and sensors connected to the torque pedal 144 are configured to generate a desired torque signal indicative of the desired torque at the transmission output 118 as indicated by the operator.

In other embodiments, the operator may indicate desired torque through (an)other input device(s) included in the operator interface 142. The input device(s) may include but is/are not limited to pedals, levers, switches, buttons, keyboards, interactive displays, dials, remote control devices, voice activated controls, and/or any other operator input devices that an ordinary person skilled in the art would understand to be functional in the disclosed embodiments now or in the future.

The controller 128 may include a processor 132 and a memory component 130. The processor 132 may be a microprocessor or other processor as known in the art.

The processor 132 may execute instructions to prevent shift hunting in powertrain 102 as described below in connection with FIGS. 2-3.

Such instructions may be read into or incorporated into a computer readable medium, such as the memory component 130 or provided external to processor 132. In alternative embodiments, hard-wired circuitry may be used in place of or in combination with software instructions to implement a method of preventing shift hunting in the powertrain 102. Thus embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and may in some embodiments take the form of transmitters and receivers of acoustic or light waves, such as those generated during radio-wave and infra-red data.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, and EPROM, a FLASH-EPROM, any other memory chip or cartridge, or any other medium from which a computer or processor 132 can read which would be known by an ordinary person skilled in the art now or in the future.

The memory component 130 may include any form or combination of forms of computer-readable media as described above. The memory component 130 and processor 132 may be located on the vehicle or machine including the powertrain 102. In an alternative embodiment, the memory component 130 and/or the processor 132 may be located remotely from the vehicle or machine. In still another alternative embodiment, the memory component 130 may include several types of computer readable media some located onboard the vehicle or machine and some located remotely.

The processor 132 and the memory component 130 may be contained in one or more units. The controller 128 is not limited to electronic and electrical circuitry, and software. In other embodiments the controller 128 may include hydraulic circuits, pneumatic circuits, mechanical control devices, or a combination of these and electronic and electrical circuitry, and software may implement a control method.

The controller 128 is communicatively connected to the engine 104 to receive signals indicative of engine 104 speed and to transmit to the engine 104 control command signals through communication link 138. Engine speed sensing and electronic engine control, including electronic engine speed control, are well known by ordinary persons skilled in the art.

The controller 128 is communicatively connected to the variator 120 to control the speed and torque output of the variator 120 through communication link 138. Speed and torque control of variators 120 is well known by ordinary persons skilled in the art.

The controller 128 is communicatively connected to the variator output speed sensor 134 to receive signals indicative of the variator 120 output speed at variator output gear 158 through communication link 138.

The controller 128 is communicatively connected to the operator interface 142 to receive signals indicative of operator commands through communication link 138 as would be known by ordinary persons skilled in the art now or in the future. In the depicted embodiment, these signals include signals indicative of operator desired torque as indicated by the position of the torque pedal 144.

The controller 128 is communicatively connected to the transmission output speed sensor 136 to receive signals indicative of the transmission output speed at transmission output 118 through communication link 138.

The controller 128 is communicatively connected to the synchronizers 166, 168, 170 to control the gear shifting of transmission 106 through communication link 138. Gear shifting through control of synchronizers is well known by ordinary persons skilled in the art.

The controller 128 is communicatively connected to the clutch assemblies 172, 174 to control the gear shifting of transmission 106 through communication link 138. Gear shifting through control of clutch assemblies is well known by ordinary persons skilled in the art.

INDUSTRIAL APPLICABILITY

Figure 2:
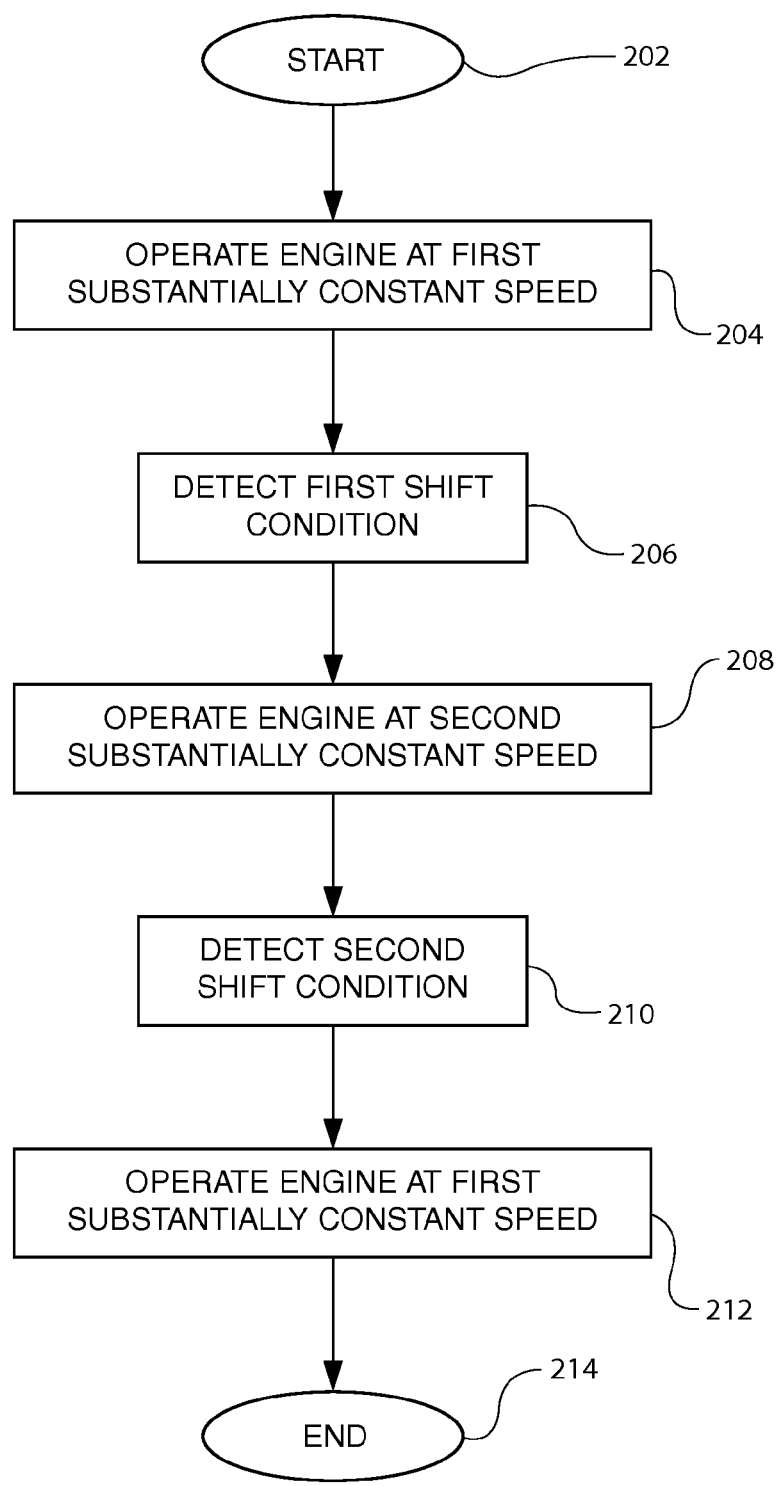
FIG. 2 depicts a flowchart of an exemplary method to prevent shift hunting in a powertrain.

Referring now to FIG. 2, a flow chart of an exemplary method to prevent shift hunting 200 in a powertrain 102 is depicted. The powertrain 102 includes the engine 104 and the transmission 106. The transmission 106 includes a variator 120, a first gearset 108, and a second gearset 110. The method 200 starts at step 202.

The method 200 includes operating the engine 104 at a first substantially constant speed 204, detecting a first shift condition 206, and operating the engine at a second substantially constant speed 208 as a function of detecting the shift condition. The second speed is different than the first speed.

Internal combustion and other fuel burning engines 104 are subject to increasing emission controls in many geographic areas. Frequently, meeting the emission controls results in reduced fuel economy and, consequently, higher costs in operating vehicles and machines. Operating an engine 104 at a substantially constant speed may increase fuel economy while still meeting emission requirements.

For purposes of this application, operating an engine 104 at a substantially constant speed means governing the engine 104, or controlling the output rotational speed of the engine 104 to a value within the tolerances of the engine 104 and the system 100 it is powering. For example, an engine 104 may be governed to 1000 rpm. Because of tolerance in the speed sensing system, control system, and engine 104 parts in manufacturing, there may be slight differences in actual engine 104 speed to the desired engine 104 speed. When loads are connected or disconnected from the engine 104, engine speed 104 may increase or decrease for a short time until engine 104 systems can reach a steady state at the desired speed. For example, fuel systems may need to provide more or less fuel and air systems more or less oxygen. Ordinary persons skilled in the art will recognize that when an engine 104 is governed to a constant value, it operates in a narrow speed band, or a substantially constant speed.

In step 204, the engine 104 is operated at a first substantially constant speed as would be known by an ordinary person skilled in the art now or in the future.

Figure 3:
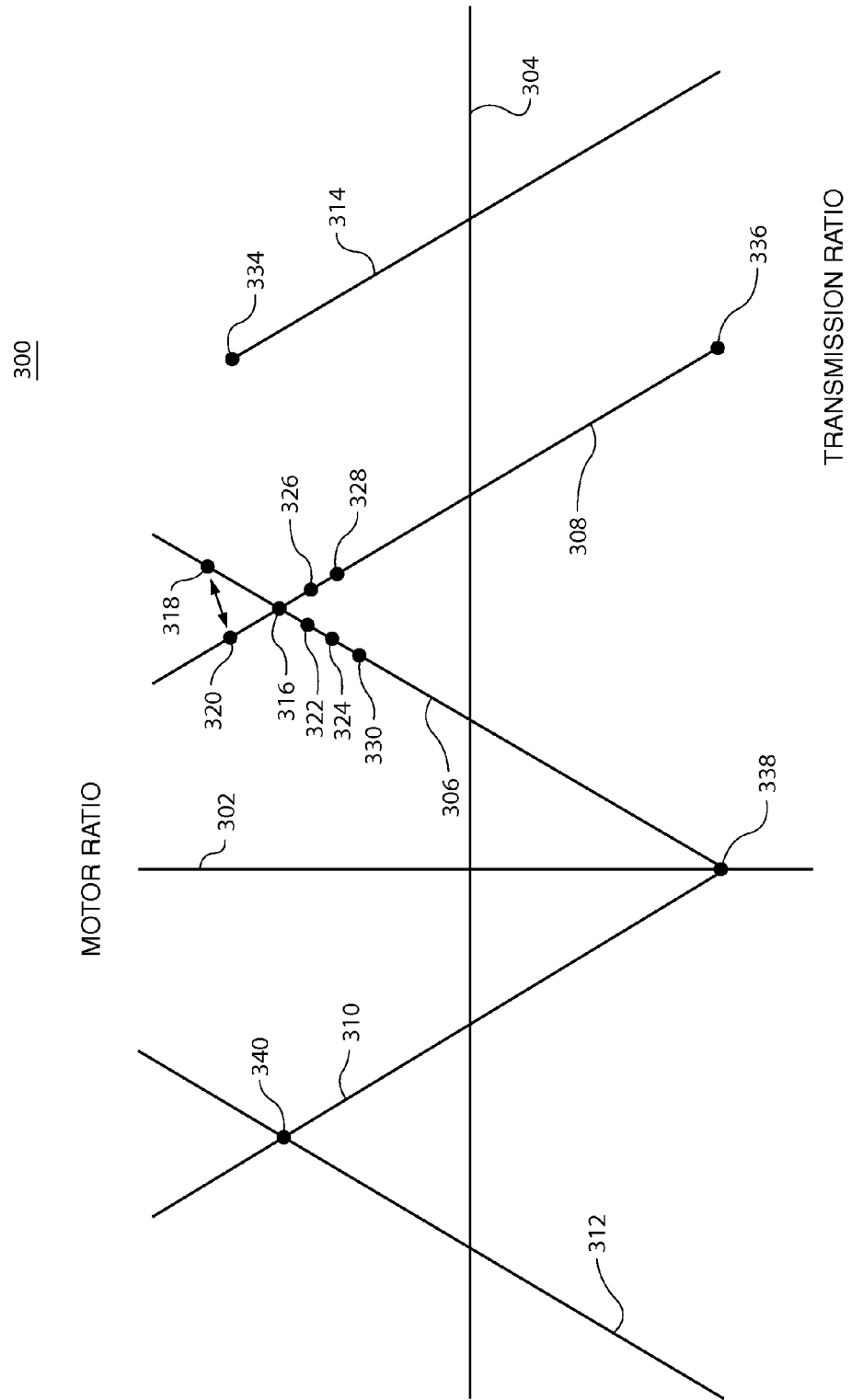
FIG. 3 depicts an exemplary graph of a relationship between a motor ratio and a transmission ratio.

Referring now to FIG. 3, an exemplary graph of a relationship 300 between a motor ratio 302 and a transmission ratio 304 is depicted. The "x" or horizontal axis is representative of the transmission ratio 304. The "y" or vertical axis is representative of the motor ratio 302.

The transmission ratio 304 is the transmission output 118 speed divided by the input speed to the transmission 106. In the embodiment depicted in FIG. 1, the input speed is the engine 104 speed transmitted through input member 150. The engine 104 includes sensors, devices, and systems to measure or estimate engine 104 speed and communicate engine 104 speed to the controller 128 through communication link 138, as would be known by an ordinary person skilled in the art now or in the future. The transmission output speed sensor 136 is configured to generate a signal indicative of transmission output 118 speed which is communicated to the controller 128 through communication link 138. The controller 128 may calculate transmission ratio 304 as a function of the engine 104 speed signal and the transmission output 118 speed signal.

The motor ratio 302 is the output speed of the variator 120 divided by the input speed to the variator 120. In the embodiment depicted in FIG. 1, the input speed is the engine speed transmitted through input member 150. The output speed is the speed at the variator output gear 158. Variator output speed sensor 134 is configured to generate a signal indicative of variator 120 output speed which is communicated to the controller 128 through communication link 138 as would be known by an ordinary person skilled in the art now or in the future. The controller 128 may calculate the motor ratio 302 as a function of the engine 104 speed signal and the variator 120 output speed signal.

When the engine 104 is operated at a substantially constant speed, an ordinary person skilled in the art will realize that the relationship 300 between the motor ratio 302 and the transmission ratio 304 is substantially equal to the relationship between the output speed of the variator 120 and the transmission output 118 speed.

Low forward gear line 306 represents the relationship 300 between the motor ratio 302 and the transmission ratio 304 when transmission output 118 is driven by the first gearset 108, and the engine 104 is operated at a substantially constant speed.

High forward gear line 308 represents the relationship 300 between the motor ratio 302 and the transmission ratio 304 when transmission output 118 is driven by the second gearset 110, and the engine 104 is operated at a substantially constant speed.

Low reverse gear line 310 represents the relationship 300 between the motor ratio 302 and the transmission ratio 304 when transmission output 118 is driven by the third gearset 112, and the engine 104 is operated at a substantially constant speed.

High reverse gear line 312 represents the relationship 300 between the motor ratio 302 and the transmission ratio 304 when transmission output 118 is driven by the fourth gearset 114, and the engine 104 is operated at a substantially constant speed.

Auxiliary gear line 314 represents the relationship 300 between the motor ratio 302 and the transmission ratio 304 when transmission output 118 is driven by the fifth gearset 116, and the engine 104 is operated at a substantially constant speed.

When the engine 104 is operated at a substantially constant speed, shifts between two gearsets 108, 110, 112, 114, 116 may be done smoothly and quickly when the motor ratios 302 and transmission ratios 304 are equal for both gearsets 108, 110, 112, 114, 116. At these points, the variator 120 output speed and the transmission output 118 speed is equal. In the embodiments represented in FIGS. 1 and 3, ideal shift points occur between low forward 306 and high forward 308 at point 316, between low forward 306 and low reverse 310 at point 338, and between low reverse 310 and high reverse 312 at point 340.

Because there is no point on high forward gear 308 and auxiliary gear 314 where the motor ratio 302 and the transmission ratio 304 are equal, an upshift between these two gearsets 110, 116 may be accomplished through disengaging the second gearset 110 from driving transmission output 118 at point 336, changing the variator 120 output speed, and engaging the fifth gearset 116 at point 334. A downshift may be accomplished by disengaging the fifth gearset 116 from driving transmission output 118 at point 334, changing the variator 120 output speed, and engaging the second gearset 110 at point 336.

In some conditions a vehicle or machine may operate in a narrow band around a shift point for a period of time. For example, when a vehicle is driving on a road with numerous hills the transmission 106 may sometimes operate on either side of a shift point continuously. This may create a condition known as shift hunting where a transmission 106 shifts rapidly from one gear to another and then back again. This may be characterized as macro-shift hunting and is well known by ordinary persons skilled in the art. This condition may be annoying to the operator, result in decreased fuel economy, and cause damage and/or wear on the transmission 106.

Another type of shift hunting may occur when the vehicle or machine begins to operate at a steady speed or operating condition at a shift point. The controller 128 shifts the transmission 106 back and forth very quickly between two gearsets 108, 110, 112, 114, 116 in response to the condition. This type of shift hunting may be happening in very minute time periods, such as micro-seconds, and may be referred to as micro-shift hunting. Micro-shift hunting is well known to ordinary persons skilled in the art.

In transmissions including flexible or fluid couplings, the shift point is often delayed when a shift hunting condition or impending shift is detected under certain operating conditions. Delaying the shift point may force a vehicle or machine to operate on one side of the shift point, using one gearset 108, 110, 112, 114, 116 continuously. If the vehicle or machine shifts at the delayed shift point, the flexible or fluid coupling may absorb any mechanical shock in the powertrain 102 due to the two gearsets having different transmission ratios at the delayed shift point. Delaying shift points to prevent shift hunting is well known to ordinary persons skilled in the art.

In a system without flexible couplings, such as the system 100 depicted in FIG. 1, undue stress on the powertrain 102, operator discomfort, and/or transmission 106 damage or wear may occur by shifting gearsets 108, 110, 112, 114, 116 at a delayed shift point. For example, if the controller 128 delayed shift point 316 to shift point 318 to prevent shift hunting, the transmission 106 may be subject to shocks causing damage and operator discomfort. Ideally, the transmission 106 would shift from point 318 to a point to the right of the shift point 316 in high forward gear 308 to maintain the same transmission ratio 304. But, the variator 120 may not be able to increase or decrease speed instantaneously and the mechanical limitations of transmission 106 will not allow this to happen. Instead stresses in many portions of the powertrain 102 will result. This may cause the powertrain to operate at various points of the relationship 300 and the transmission 106 may suffer damage or severe wear. For example, the transmission may shift instead to point 320. A jerk will be felt, as the transmission output 118 speed is reduced through mechanical limitations. The controller 128 may sense that at point 320, the variator 120 and vehicle or machine speed is such that a shift back to low forward 306 is necessary. The transmission 106 then shifts to low forward 306 with another jerk. This may continue until the system stabilizes.

Referring back to FIG. 2, the controller 128 detects a first shift condition at step 206. The first shift condition may include sensing conditions indicate an imminent shift. For example, the transmission ratio 304 may be equal to or less than a predetermined value from a shift point. In another embodiment, the imminent shift may be detected as a function of one or more operating parameters such as engine speed, transmission output speed, clutch state, what gearset 108, 110, 112, 114, 116 is driving the transmission output 118, operator inputs, and transmission output torque. Predicting imminent shifts in transmissions is well known by ordinary persons skilled in the art.

In another embodiment the first shift condition may include detecting a shift hunting condition. For example, the controller may determine that a shift hunting condition exists when the transmission 106 shifts gearsets 108, 110, 112, 114, 116 more than a predetermined number of times in a predetermined time period. Detecting shift hunting conditions in transmissions is well known by ordinary persons skilled in the art.

In other embodiments the first shift condition may include any shift condition which an ordinary person skilled in the art now or in the future would interpret as necessitating or signaling a benefit in the implementation of measures or methods to prevent shift hunting.

In step 208, the controller 128 operates the engine 104 at a second substantially constant speed, different than the first speed as a function of detecting the first shift condition. In one embodiment the second substantially constant speed is within three hundred (300) revolutions per minute (RPM) of the first substantially constant speed.

Referring again to FIG. 3, while the transmission 106 is operating at the first substantially constant speed in low forward gear 306, it may approach the shift point 316 between low forward gear 306 and high forward gear 308. It may be desirable for the transmission 106 to operate constantly in either low forwards gear 306 or high forward gear 308, rather than shift back and forth between the two gearsets 108, 110.

A first shift condition may be detected. The first shift condition may be detected when the transmission 106 reaches a point 322 within a predetermined value of the transmission ratio 304 at the shift point 316. When the transmission reaches point 322 the controller 128 may operate the engine 104 at a second substantially constant speed. The second substantially constant speed may be greater than the first substantially constant speed. Increasing the engine 104 speed may tend to move the point of transmission 106 operation away from the shiftpoint 316. For example, increasing the engine 104 speed may move the point of operation from point 322 to point 324 while maintaining the same transmission output 118 speed, or vehicle speed in a vehicle embodiment. Operating the engine 104 at the second substantially constant speed may allow the transmission 106 to operate continuously in low forward gear 306.

Referring back to FIG. 2, in step 210, the controller 128 may detect a second shift condition. The second shift condition may include a shift between two gearsets 108, 110, 112, 114, 116. The operator of a vehicle or machine including a powertrain 100 may wish to continue to accelerate transmission output 118 speed, causing a shift at shiftpoint 316.

In an alternative embodiment, the vehicle or machine transmission output 118 may decrease after the engine 104 speed is changed from the first substantially constant speed to the second substantially constant speed. As the transmission output 118 speed continues to decrease, the transmission ratio 304 may reach a value where the risk of shift hunting is minimal. In this embodiment, the second shift condition may include the transmission ratio being less than or equal to a predetermined value.

In an embodiment where the first shift condition includes a shift hunting condition, the second shift condition may include an anti-shift hunting condition. If the powertrain 100 is operating in a small band around shiftpoint 316, a shift hunting condition may occur. Operating the engine 104 at a second substantially constant speed may move the operating point away from the shiftpoint 316, resulting in an anti-shift hunting condition.

In other embodiments, the second shift condition may include any condition that would indicate that the risk of a shift hunting condition has decreased and that it is desirable to operate the engine 104 at the first substantially constant speed that would be known to an ordinary person skilled in the art now or in the future.

Referring back to FIG. 2, the controller 128 may operate the engine 104 at the first substantially constant speed as a function of detecting the second shift condition. When the transmission 106 shifts from low forward gear 306 to high forward gear 308, it may be desirable that the transmission 106 operating point move as far from the shiftpoint 316 as possible to prevent a shift hunting condition.

Referring to FIG. 3, in a non-limiting example, after shifting from low forward gear 306 to high forward gear 308, the transmission 106 may be operating at point 326. The engine 104 may be operating at the second substantially constant speed. The controller 128 may operate the engine at the first substantially constant speed, moving the operating point away from the shiftpoint 316 to point 328, without impacting transmission output 118 speed. At this operating point there may be less risk of shift hunting.

In another example, where the transmission output speed 118 decreased after the engine speed 102 changed to the second substantially constant speed, and the second shift condition included the transmission ratio 104 being less than or equal to a predetermined value, the controller may change the engine 104 speed to the first substantially constant speed as a function of detecting the second shift condition. In an example, the controller 128 may detect the second shift condition when the transmission ratio 104 is at point 330. The controller 128 may operate the engine 104 at the first substantially constant speed as a function of detecting the second shift condition. The transmission 106 operating point may move from point 330 to point 322 when the engine 104 speed changes from the first substantially constant speed to the second substantially constant speed, without changing the transmission output 118 speed.

Although the method 200 is described in relation to an upshift of gears, an ordinary person skilled in the art will understand that the same method 200 is applicable in downshifts as well. Although the method 200 has been described in relation to a shift between low forward 306 and high forward 308, an ordinary person skilled in the art will understand that the same method applied to shifts between low forward 306 and low reverse 310; and low reverse 310 and high reverse 312.

Although the shift from high forward gear 308 to auxiliary gear 314, and from auxiliary gear 314 to high forward gear 308 requires neutralizing the transmission, method 200 is still applicable. While changing variator 120 speed, engine 104 speed may also be changed from a first substantially constant speed to a second substantially constant speed to reduce the time needed for the shift. Once the shift is accomplished, the engine 104 may again be operated at the first substantially constant speed.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A method for preventing shift hunting in a powertrain including an engine and a transmission having a variator, a first gearset, and a second gearset, comprising:
   operating the engine at a first substantially constant speed,
   detecting a first shift condition, the first shift condition including one of an imminent shift and a shift hunting condition, and
   operating the engine at a second substantially constant speed, the second speed different than the first speed as a function of detecting the first shift condition.

2. The method of claim 1, wherein the first shift condition includes the imminent shift.

3. The method of claim 1, wherein the first shift condition includes a the shift hunting condition.

4. The method of claim 1, further comprising detecting a second shift condition, the second shift condition including one of a completion of a shift, and detecting a transmission ratio at least a certain value from a shift point.

5. The method of claim 4, wherein the second shift condition includes the completion of a shift.

6. The method of claim 5, further comprising suspending shift logic for a time period.

7. The method of claim 4, wherein the second shift condition includes detecting a transmission ratio at least a certain value from a shift point.

8. The method of claim 4, further comprising operating the engine at the first substantially constant speed as a function of detecting the second shift condition.

9. The method of claim 1, wherein the second substantially constant speed is within 300 rpm of the first substantially constant speed.

10. A system for preventing shift hunting, comprising:
    a powertrain including,
       an engine,
       a transmission operably connected to the engine, the transmission having a variator, a first gearset, a second gearset, and an output, and
       a controller configured to;
          operate the engine at a first substantially constant speed,
          detect a first shift condition, the first shift condition including one of an imminent shift and a shift hunting condition, and
          operate the engine at a second substantially constant speed, the second speed different than the first speed as a function of detecting the first shift condition.

11. The system of claim 10, wherein the first shift condition includes the imminent shift.

12. The system of claim 10, wherein the first shift condition includes the shift hunting condition.

13. The system of claim 10, wherein the controller is configured to detect a second shift condition, the second shift condition including one of a completion of a shift, and detecting a transmission ratio at least a certain value from a shift point.

14. The system of claim 13, wherein the second shift condition includes the completion of a shift.

15. The system of claim 14, wherein the controller is configured to suspend shift logic for a time period.

16. The system of claim 13, wherein the second shift condition includes the transmission ratio at least a certain value from a shift point.

17. The system of claim 13, wherein the controller is configured to operate the engine at the first substantially constant speed as a function of the second shift condition.

18. The system of claim 10, wherein the second substantially constant speed is within 300 rpm of the first substantially constant speed.

19. The system of claim 10, wherein the variator includes a hydrostatic transmission.

20. The system of claim 10, wherein the variator includes an electric motor.

21. The system of claim 10 wherein,
the transmission includes an adder,
the engine is operably coupled to the variator, and a mechanical gearing in parallel to the variator, and
the variator and the mechanical gearing are operably coupled through the adder.

22. The system of claim 21 wherein the adder includes at least one planetary gearset.

* * * * *